United States Patent
Nilsson

(10) Patent No.: US 7,245,903 B1
(45) Date of Patent: *Jul. 17, 2007

(54) WIRELESS TELEPHONE SYSTEM WITH PROGRAMMING AND INFORMATION SERVICE

(76) Inventor: Byard G. Nilsson, 2065 Santa Margarita Dr., Fallbrook, CA (US) 92028

( * ) Notice: Subject to any disclaimer, the term of this patent is extended or adjusted under 35 U.S.C. 154(b) by 131 days.

This patent is subject to a terminal disclaimer.

(21) Appl. No.: 11/044,101

(22) Filed: Jan. 27, 2005

Related U.S. Application Data

(63) Continuation-in-part of application No. 09/954,369, filed on Sep. 16, 2001, now Pat. No. 6,862,463, which is a continuation-in-part of application No. 09/860,992, filed on May 17, 2001, now Pat. No. 6,917,802, which is a continuation-in-part of application No. 09/226,178, filed on Jan. 4, 1999, now Pat. No. 6,308,053, which is a continuation-in-part of application No. 08/955,338, filed on Oct. 21, 1997, now Pat. No. 6,298,250, which is a continuation-in-part of application No. 08/878,864, filed on Jun. 19, 1997, now Pat. No. 6,049,710.

(51) Int. Cl.
*H04M 3/42* (2006.01)
*H04M 3/493* (2006.01)
*H04Q 7/22* (2006.01)

(52) U.S. Cl. ............... 455/414.2; 455/414.1; 455/414.3; 455/418; 455/456.1; 455/456.3; 455/456.5; 455/456.6; 455/457; 455/550.1; 455/563; 455/564; 704/270.1; 704/277; 704/203; 379/88.01; 379/88.04

(58) Field of Classification Search .. 455/414.1–414.4, 455/418–420, 456.1–457, 550.1, 556.1, 556.2, 455/563, 564, 569.1; 704/270.1, 277, 203; 379/88.01, 88.04
See application file for complete search history.

(56) References Cited

U.S. PATENT DOCUMENTS

| | | | | |
|---|---|---|---|---|
| 4,984,177 A | * | 1/1991 | Rondel et al. | ............... 704/277 |
| 5,199,062 A | * | 3/1993 | Von Meister et al. | ..... 379/88.04 |
| 5,679,077 A | * | 10/1997 | Pocock et al. | ................ 463/19 |
| 5,680,506 A | * | 10/1997 | Kroon et al. | ................ 704/203 |
| 6,862,463 B1 | * | 3/2005 | Nilsson | ....................... 455/564 |

* cited by examiner

*Primary Examiner*—Steve M. D'Agosta

(57) ABSTRACT

A telecommunication system serves individual programmed instruments by wireless operation, voice dialing and, prepaid operation. The central equipment involves a multiple port wireless platform along with computing capability for interfacing a multitude of mobile station instruments simultaneously for interactive audio communication. Depending on programmed operation, the central equipment may receive vocal instruction data from individual instruments, to bridge connections to other telephone terminals, incur financial transactions, as by credit card number, or to provide a geographic information service. Specific information on physical locations is addressed and fetched on the basis area and target location characteristics.

16 Claims, 7 Drawing Sheets

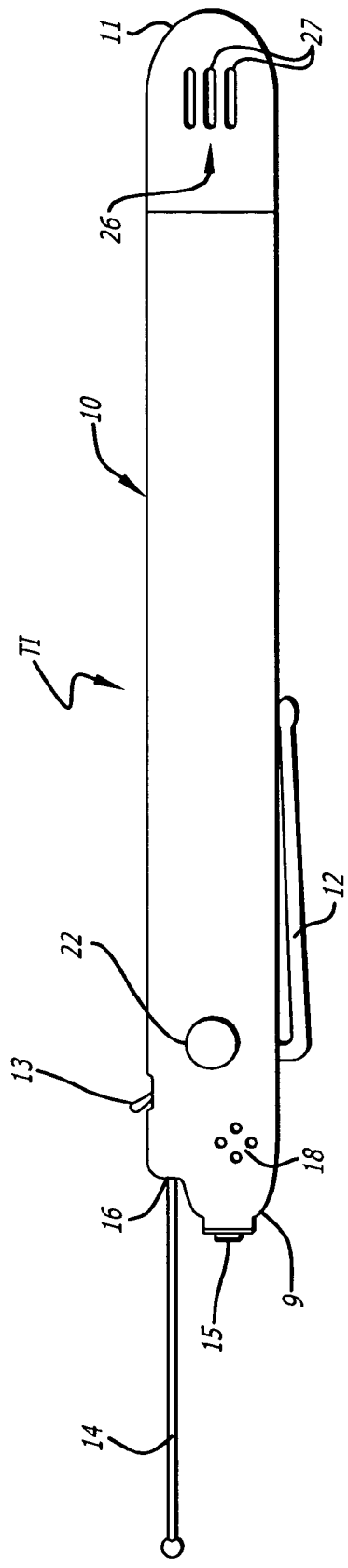
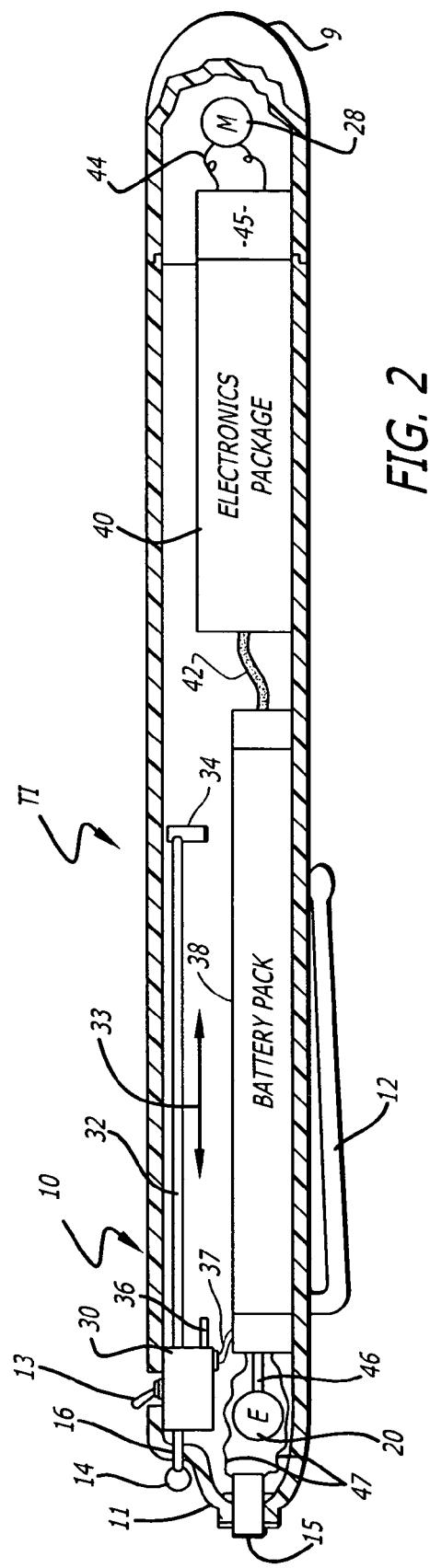

WIRELESS TELEPHONE SYSTEM WITH PROGRAMMING AND INFORMATION SERVICE

RELATED APPLICATION INFORMATION

This is a continuation-in-part of prior patent applications entitled (1) "Wireless Telephone System With Information Service" filed Sep. 16, 2001 now U.S. Pat. No. 6,862,463 and assigned Ser. No. 09/954,369, which is a continuation-in-part of a prior patent application entitled "Mobile Keyless Telephone Instruments and Wireless Telecommunications System Having Voice Dialing and Voice Programming Capabilities," filed May 17, 2001 now U.S. Pat. No. 6,917,802 and assigned Ser. No. 09/860,992, which is a continuation-in-part of a prior patent applications entitled "Recyclable Wireless Telephone Unit With a Secured Activation Switch," filed Jan. 4, 1999 and assigned Ser. No. 09/226,178, now U.S. Pat. No. 6,308,053, which is a continuation-in-part of a prior patent application entitled "Wireless Prepaid Telephone System with Extended Capability" filed Oct. 21, 1997 and assigned Ser. No. 08/955,338, which is now U.S. Pat. No. 6,298,250, which is a continuation-in-part of a prior patent application entitled "Wireless Prepaid Telephone System With Dispensable Instruments" filed Jun. 19, 1997 and assigned Ser. No. 08/878,864, now U.S. Pat. No. 6,049,710, and "Wireless Prepaid Telephone System with Extended Capability," filed Mar. 21, 2001 and assigned Ser. No. 09/814,537, which is a continuation of Ser. No. 08/955,338 (above)

(2) "Mobile Keyless Telephone Instruments and Wireless Telecommunications System Having Voice Dialing and Voice Programming Capabilities" filed May 17, 2001 and assigned Ser. No. 09/860,992, which is a continuation-in-part of a prior patent applications entitled "Recyclable Wireless Telephone Unit With a Secured Activation Switch," filed Jan. 4, 1999 and assigned Ser. No. 09/226,178, now U.S. Pat. No. 6,308,053, and (3) "Wireless Prepaid Telephone System for Programmed and Expanded Use" filed May 15, 2003 and assigned Ser. No. 10/438,524, which is a divisional of a prior patent application entitled "Mobile Keyless Telephone Instruments And Wireless Telecommunications System Having Voice Dialing And Voice Programming Capabilities," filed Jan. 22, 2002 and assigned Ser. No. 10/054,506, now U.S. Pat. No. 6,584,327, which is a continuation of a prior patent application entitled "Mobile Keyless Telephone Instruments and Wireless Telecommunications System Having Voice Dialing and Voice Programming Capabilities, filed May 15, 2001 and assigned Ser. No. 09/859,995, now U.S. Pat. No. 6,400,967, which is a divisional of a prior patent application entitled "Recyclable Wireless Telephone Unit With a Secured Activation Switch," filed Jan. 4, 1999 and assigned Ser. No. 09/226,178, now U.S. Pat. No. 6,308,053, each of which is hereby incorporated by reference as if set forth fully herein.

BACKGROUND OF THE INVENTION (1) Field of the Invention

The present invention relates to mobile telecommunication and more specifically to wireless telephone systems including central station equipment and telephone instruments that can be programmed for specific use as well as to selectively address various forms of information, all while roaming through geographic areas and being compact, inexpensive and simple.

(2) Background and Description

In recent years, considerable progress has been made in the field of wireless or mobile telephone instruments and systems. In that regard, wireless telephone instruments, sometimes called "mobile stations" (MS) have come into widespread use, accommodated, for example, by geographically defined cells. Although the improved instruments and systems are quite effective, and have considerably enhanced telephonic communication, needs for improvement continue to exist.

Typically in wireless systems, individual telephone instruments communicate at an initial level with central equipment, sometimes called "base stations" (BS). Operating with other components as a composite system, the geographically-separate base stations enable mobile telephone instruments to roam through different geographic areas or cells, even during the coarse of a call Thus, from various locations, mobile instruments may be able to access virtually any telephone terminal throughout an entire dial-up telephone network, sometimes called the "public switched telephone network" (PSTN) and in the course of a call, roam freely from one call to another.

Traditionally, a composite mobile telecommunications system includes some form of a switching system, sometimes including a unit called a "mobile switching center" (MSC). The MSC may be provided, along with other structure between a base station (BS) and the public switched telephone network (PSTN). Accordingly, conventional mobile management is accomplished using various well known techniques and structures. However, note that radical system changes are in progress to expand and improve the systems.

A need exists to better accommodate the desires of wireless telephone users. Specifically, the present developments are based, to some extent, on recognizing the use patterns and characteristics of mobile telephone instruments. Accordingly, it has been recognized that certain mobile services are particularly appropriate for wireless instruments. That is, needs frequently arise to accommodate situations attendant the individual use and the mobility of wireless instruments. For example, the present invention recognizes possibilities for misuse, cost, size, and that individually programmed operations providing selective features and ready access to geographically related and other information is helpful to the users of wireless instruments, especially for keyless, or spoken-word actuated instruments.

SUMMARY OF THE INVENTION

To some extent, the present invention is based on recognizing certain distinct aspects of wireless telephones. With mobility comes the frequent need for geographic and other information that is necessary or useful, as when traveling. Also, wireless telephone instruments tend to be more personal. That is, a large fraction of these instruments are used almost exclusively by only one person. Consequently, in accordance herewith, instruments can be effectively customized, as for example, with specific features, operations and interfaces, as with language or voice as in a keyless embodiment. Accordingly, in part, the present invention is based on recognizing the needs of users and that a simple wireless telephone instrument can be individually programmed for extended and customized use, operating cooperatively with a central system that performs a wide variety of functions.

For example, during the mobile use of wireless instruments, the need often arises for information, e.g. geographic, telephonic or other travel related data. Accordingly, utilizing the voice actuated operation in accordance with embodiments hereof, a convenient information service is provided for mobile instruments.

Generally, in accordance with the disclosed embodiments hereof, customized, convenient, inexpensive, voice-actuated, prepaid, wireless telephone instruments are provided, that involve limited complications, along with limited risk and exposure for owners while enabling expanded communication capabilities and features. For example, customized language, incoming call options, expanded message formats, call selectivity, screening and routing operations all are made available along with locator and tracking capabilities. Furthermore, in accordance herewith, capabilities may be incorporated to easily and effectively accomplish telephone transactions including certain communications as in cases of emergency or for control functions. Certain aspects of communication, as relating to fraud control, also can be restricted to a single user of an instrument. Numerical voice signals, as number words, are recognized as digits, e.g. digits "zero" through "nine", and may be converted to a dialing form (DTMF or digital signals) for programming, control, dial-up, service or routing functions. Representative code words also may be recognized and variously encoded to accomplish control operations, number dialing, access to information and other services. For example, as a result of customizing operations, single non-numerical words, e.g. "home" may be recognized to command a specific called number. Also, words spoken by authorized users may verify a proper user. Generally, as described in detail below, words spoken, or sounds made by a wireless instrument user in accordance herewith may produce: control signals, number signals, dial-up code signals or information index or extraction signals.

Basically, in accordance with the present invention a wireless telephone instrument consists essentially of an earphone, a microphone, a radio transceiver, a battery pack and a control unit (with memory, switching and signaling capabilities) all embodied in a small convenient housing. As disclosed, the housing incorporates a multiple stage cover to deter pre-sale use and post-use tampering, as well as to facilitate recycling.

As disclosed herein, the present wireless telephone instruments operate as part of a composite system in cooperation with a central station having a multiple-port platform. The ports of the platform accommodate multiple wireless (and other) telephone instruments simultaneously, to variously access any of a variety of programmed operations and ultimately other services or remote terminals.

In a disclosed embodiment, for outgoing calls, the users of wireless telephone instruments are signaled as by being prompted vocally, to speak numerical control words as well as message words. For example, spoken words may indicate programming, routing or control signals as well as audio communication. Thus, communication by users of the wireless telephone instruments as disclosed herein, is in the form of voice signals generated from the user's voice and variously interpreted and used at the central station depending on form and conditions.

At a central station, certain numerical voice signals are recognized as digits, e.g. digits "zero" through "nine", by a voice recognition unit and consequently are converted to a dialing form (DTMF or digital) for programming, control, dial-up or routing functions. Words also may be assigned for indicating the telephone star (or asterisk "*") and the pound sign ("#") signals as they are generated using a traditional telephone keypad. By customizing operations, single non-numerical words, e.g. "home" also may be recognized to command a specific called number. Other words, as spoken by authorized users, may serve to verify proper use.

Essentially, the central-station systems operating with mobile instruments as described herein include a voice generator, e.g. an audio response unit (ARU), a voice recognition unit, e.g. minimally with "number" or numerical word recognition capability, and a control unit operating with a memory as for storing prepaid values, instrument control and operating data. Furthermore, a data base is provided, accessible by the control unit to fetch information in response to requests by mobile instrument users.

Upon the sale of an instrument (as disclosed), communication is established with the central station during a preliminary interface to program the instrument in accordance with data stored at the central-station. Various customized features and operations are available. For example, instruments may be afforded a selection of languages for communication. Voice recognition and control sounds may be customized. Incoming calls may be a selected option, as may various other controls, limitations and related operations. Customization may include providing an information service to individual wireless instruments. Thus, a user is afforded a variety of operating characteristics and services to thereby tailor an instrument for personal use according to centrally stored data.

In accordance with one keyless embodiment of the present invention, a central-station platform interfaces individual wireless telephone instruments to accomplish various communication objectives. Voice cues or sound signals prompt the users of wireless instruments to provide vocalized numerals (audio) that are received, as in combinations, to indicate various desired objectives. As indicated above, custom interfaces may be selected and executed, as well as various other controls. Dial-up or routing signals also may be generated to accomplish: a desired terminal connection, identification, authentication or verification.

For routine calls, voice cues or sound signals may prompt the users of wireless instruments to speak number words to reach desired telephone terminals. Other custom interfaces involving spoken words or sounds produced by a user may be selected and executed as for interfacing an information service. In certain embodiments, the central station may determine whether the instrument has an adequate pre-paid value to cover a call. If so, the call or other service is completed, as through an associated mobile network and a public network (PSTN). If charges are levied on the call, they are reflected in the instrument's prepaid balance.

With reference to current technology, certain known elements of existing central stations may be variously embodied in a mobile network hereof, as by supplementing and modifying a base station and/or mobile switch center. Accordingly, the system hereof may be variously incorporated in traditional or future wireless telecommunications systems to accommodate various features and improvements hereof.

In summary, in accordance herewith, program customized, convenient, economical, inexpensive and effective wireless instruments may be distributed with defined and relatively small risk, while providing extensive and customized service including data input, routing and geographically related information service.

BRIEF DESCRIPTION OF THE DRAWINGS

In the drawings, which constitute a part of this specification, exemplary embodiments of the invention are set forth as follows:

FIG. 1 is a side view showing a keyless, wireless, mobile telephone instrument in accordance with the present invention;

FIG. 2 is a sectional view taken lengthwise through the instrument as shown in FIG. 1;

DESCRIPTION OF THE PREFERRED EMBODIMENT

Figure 3:
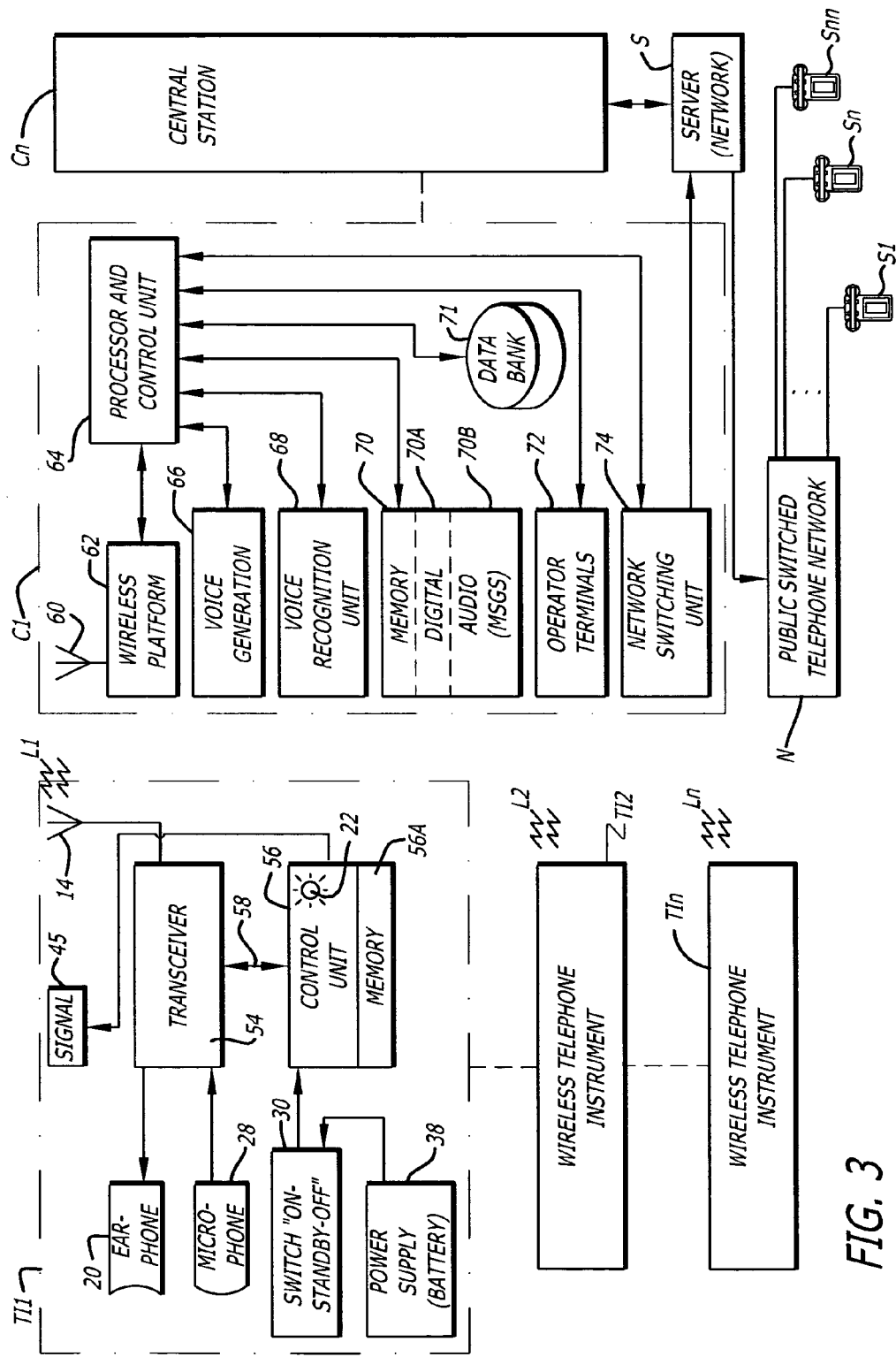
FIG. 3 is a block diagram of a system in accordance with the present invention, showing telephone instruments and central station components for use with a public switched telephone network.

As indicated above, detailed embodiments of the present invention are disclosed herein. However, the embodiments are merely representative, recognizing that a wide variety of alternative embodiments are possible utilizing a multitude of different techniques and components that may be variously distributed and located. Nevertheless, the disclosed embodiments are deemed to afford the best embodiments for purposes of disclosure and to provide a basis for the claims herein which define the scope of the present invention.

Referring initially to FIG. 1, a wireless mobile telephone instrument TI is depicted showing some exterior components. Note that the instrument TI is keyless, i.e. void of a traditional telephone keypad. Specifically, the instrument TI is embodied in a tubular housing 10 with somewhat hemispherical ends 9 (left) and 11 (right) to define a hand held configuration that is somewhat similar to that of a writing instrument, e.g. a fountain pen.

Near the end 9 of the housing 10, a pocket clip 12 is affixed to extend parallel to the central axis of the housing 10. The clip 12 may serve as a handle and accommodates convenient attachment of the instrument TI during storage. Note that the pocket clip 12 may be variously placed radially to attain the most universally convenient location for use as a handle.

Also apparent from the exterior of the instrument TI is an antenna 14 (FIG. 1, upper left) which is telescopically mounted either to be substantially contained in the housing 10 or to extend through a port 16, so that its major length is outside the housing 10. Note that in FIG. 1, the antenna 14 is shown partially extended from the housing 10 while in FIG. 2, it is shown retracted.

Near the antenna 14 is a manual on-off switch 13 which functions in conjunction with the structure of the antenna 14 to set each of three possible states for the instrument TI, specifically: "active", "standby" or "off" as described in detail below.

Also, near the antenna port 16 (FIG. 1) at the tip of the end 9, is a receptacle 15 for a jack (not shown) to recharge the instrument. Somewhat adjacent the receptacle 15, an array of small openings 18 penetrate the housing 10 for passing sound from an earphone 20 (FIG. 2, left).

Mounted near the array of openings 18 (FIG. 1) is a pilot lamp 22 which is illuminated during the state "active". The individual states are further indicated by the position of the antenna 14. Thus, a switching structure for setting the three states involves the antenna 14 and the switch 13, as described below with reference to FIG. 2.

Near the end 11 (FIG. 1, right) a group 26 of slots 27 penetrate the housing 10 for passing a users voice sounds to a microphone 28 (FIG. 2, right). Thus, the instrument TI is configured to position the microphone 28 near a user's mouth while the earphone 20 is positioned near the user's ear. The elemental simplicity and convenience of the instrument TI are apparent, both for storage and use.

The earphone 20 (FIG. 2) and the microphone 28, mentioned above, are firmly fixed within the housing 10. Also fixed in the housing 10 is a switch device 30 (left) configured as a small block. The switch device 30 supports both the antenna 14 and the switch 13. It is involved in setting the state of the instrument T1. Structurally, the switch device 30 defines a small bore (not shown) that telescopically receives an elongate shaft 32 of the antenna 14. Accordingly, the switch device 30 provides a slide bearing to accommodate axial movement of the antenna 14.

When the antenna 14 is withdrawn to extend fully from the housing 10, a knob 34, located at the inner end of the antenna shaft 32 (right), engages a spring-biased plunger 36 extending from the switch device 30. The knob 34 forces the plunger 36 telescopically within the switch device 30. Note that forms of plunger switch devices, as embodied in the switch device 30, are well known and widely used. In that regard, retraction of the antenna 14 releases the spring-biased plunger 36 allowing it to return to the exposed position (off) as illustrated (FIG. 2).

In operation, control logic embodied in the switch device 30 decodes the two binary positions of the members (switch 13 and antenna 14, FIG. 2) to set the individual states. Specifically, if programmed for use, the operational states of the instrument TI are as follows:

| STATE | DESIGNATION | SWITCHING |
|---|---|---|
| "off" | CA | antenna 14 in, switch 13 "off" (no operations) |
| "stdby" | CD | antenna 14 out, switch 13 "off" (receive incoming calls) |
| "active" | CE | antenna 14 out, switch 13 "on" (outgoing call mode or call in progress) |

The states CE and CD are indicated by similarly designated binary signals provided by a simple truth-table decoder (not shown) and are communicated to a central station for control use. Note that the "off" state CA coincides to a "no signal" state.

The instrument components are electrically interconnected to accomplish operations as described in detail below. Specifically, the switch device 30 is coupled by a cable 37 through a battery pack 38 to an electronics package 40. A tone signal or buzzer 45 in the package 40 commands attention. Connections from the electronics package 40 extend through a cable 42 to the battery pack 38, the microphone 28 (wires 44) and to the earphone 20 (wires 46). The battery pack 38 also is connected to the charging receptacle 15 by wires 47. The electronics package 40 may comprise an integrated circuit chip (not separately shown) constituting the component electronic parts to operate as described below.

To preliminarily consider the distribution and use of the instrument, a purchaser might take delivery with only minimal formality. In return for the instrument, a prepaid amount would be paid and recorded. The programming either can be minimal or rather extensive; however, it may be accomplished by a central-station interface requiring only a short time. Instruments may well be configured and marketed such that programming is performed by a sales person or by the purchaser. Essentially, after verifying that the instrument is activated, the sales person or user (or owner) has the opportunity to customize an instrument TI to select specific operations and functions. Any of the following exemplary program choices of functions and operations may customize an instrument TI. Each is explained in greater detail in parent cases.

| | |
|---|---|
| PIN: | choose a desired PIN, or operation without PIN verification |
| LANGUAGE AND/OR VOICE: | choose language or voice recognition for interface operation |
| INCOMING CALLS: | choose to receive or not receive incoming calls |
| LIMIT CALLS: | limit incoming calls to specific calling numbers |
| OUTGOING LIMITS: | choose to limit outgoing calls to specific area codes |
| WORD DIALING: | choose and assign code word dialing |
| LOCATION REPORTS: | choose to enable location reports |
| INFORMATION: | choose to enable information service |

After the customized programming is completed, for basic dial-up operation of the instrument TI, a user simply withdraws the antenna 14 and flips "on" the switch 13 (setting the "active" state CE). With the earphone 20 near the users ear, audible prompts soon are heard instructing the user to respond, as by speaking digits of a called number. In routine telephone operation, after such audio communication with the central station, a communication link may be completed from the instrument TI to a desired remote telephone terminal.

Before considering other operating aspects of the system, it will be useful to treat additional structural details of the system. In FIG. 3, a plurality of individual wireless telephone instruments TI1 through TIn are represented (left). For example, the instruments TI1-TIn may take the physical form of the instrument TI as described with reference to FIGS. 1 and 2 and as represented in block form in FIG. 3.

The wireless instruments TI1-TIn interface a public switched telephone network N (FIG. 3, lower center) through central wireless stations C1-Cn and a server S. Of course, the public switched telephone network N also is coupled to (or includes) a multitude of other telephone terminals as symbolically represented by terminals S1 through Sn. As known in the art, any of a wide variety of techniques and structures can be utilized to selectively accomplish the connective functions through a wireless network and a public network to the terminals S1-Sn.

The stations C1 through Cn function in cooperation with the instruments TI1 through TIn. For example, as well known in the art, the stations C1-Cn may serve as base radio stations for different geographic areas and may be managed by the server S to accommodate roaming by the instruments TI1-TIn. Details of the wireless management and server functions are well known and consequently are not treated here in any detail. However, note that the server S may be replicated and that various of the wireless and conventional telephone functions may be performed either by the central stations C1-Cn or in the server S, depending on specific system architecture and design criteria.

Certain other aspects of the system of FIG. 3 are well known, for example, identification methods, broadcast techniques, authentication techniques, calling processes, cellular organizations and mobility management all are well known. Therefore, such elements and techniques are not treated here in further detail. Detailed descriptions of such aspects of mobile telecommunications are provided in a book entitled, *Mobile Telecommunications Networking*, by Michael D. Gallagher and Randal A. Snyder, McGraw Hill, 1997, ISBN 0-07-063314-2, incorporated by reference herein. Particularly, the book treats techniques for interfacing a plurality mobile stations or instruments (through base stations) with a public switched telephone network. Generally as disclosed herein, the central stations C1-Cn can be related as base stations to function with the server S which, as stated above, may embody various wireless network structures.

To consider the system of FIG. 3 in greater detail, the telephone instrument TI1 (represented in a dashed-line block) includes representations of the earphone 20, the lamp 22, the microphone 28, the antenna 14, the switch device 30, the buzzer or signal 45, and the power supply or battery pack 38, all as described above. Furthermore, as illustrated, the battery 38 (power supply) is connected to electronics package elements, specifically including: a transceiver 54 and a control unit 56. Also, the control unit 56 and the transceiver 54 are interconnected by a cable 58.

As indicated, the control unit 56 and the transceiver 54 are contained in the electronics package 40 (FIG. 2). In part, the transceiver 54 may take a form somewhat similar to units well known in contemporary wireless telephone systems. Both digital data and audio signals may be transmitted by the transceiver 54; however, only audio signals (analog or digital, but essentially vocal) are received for the user and provided directly by the user.

The control unit 56 in the keyless instrument TI includes a memory 56A (ROM) primarily for storing identification data for the instrument and operational control data for the control unit 56. Generally, the functions of the control unit 56 (treated below) involve the transmission of identification signals and sequencing the transmission and receipt of voice signals during interface operations.

As indicated above, the wireless telephone instruments TI1, TI2 and TIn may utilize currently well-known wireless techniques for communication with the central stations C1-Cn. Wireless communication is represented in FIG. 3 by wavy lines L1, L2 and Ln respectively. Such communication is to and from the antennas 14 of the instruments TI1, TI2 and TIn through a central station antenna 60 to a wireless telephone platform 62. As suggested, the platform 62 incorporates substantial radio facility and may be capable of simultaneously accommodating both wireless and conventional communication with multiple calls, involving multiple calling numbers from multiple terminals.

The platform 62 (described in greater detail below) is coupled to a processor and control unit 64 serving to process data and to control the operations, of the central station C1. Functionally, the unit 64 sequences the operation of components in the central station C1, as disclosed below to interface calls. Basically, after preliminary programming operations, it may control: screening and programming interfaces, treating requests for location information or other data, accommodating special routing commands, placing and receiving calls, regulating exchanges and generally controlling interfaces for receiving data, cuing callers, and accomplishing telephonic services and transactions.

To accomplish the control functions, as well as approval and routing operations of the central wireless station C1, the unit 64 is coupled to: a voice generator 66 (ARU), a voice recognition unit 68, a memory 70, operator terminals 72 (collectively represented), a data bank 71, and finally, a network switching unit 74, which is also connected through the server S to the public switched telephone network N.

As indicated above, some components of the central station C1 are well known. Specifically, voice generators are well known as in forms of Automatic Response Units (ARUs) which may include some additional capabilities and are widely used to cue callers in telephonic interface systems.

Voice recognition units, as the unit 68, are well known and have been developed to a attain a good level of reliably in identifying the spoken words for the numerals "zero" through "nine" in an audio form, even when spoken by different persons and communicated by telephone. For example, voice recognition units providing an alternative to the immediate generation of dual-tone multi-frequency (DTMF) signals are described in U.S. Pat. No. 5,509,060 issued Apr. 16, 1996 to Hall et al. In some embodiments hereof, the voice recognition unit 68 has the further capability to recognize voice signature words (code words for telephone numbers) and other command or code words when spoken.

The memory 70, in the central wireless station C1, involves a substantial capacity and includes a digital data section, generally designated as 70A and an audio section generally designated as 70B. Specific data fields for the instrument TI1 are provided in sections 70A1 and 70B1 as treated in parent cases.

In some situations, direct communication with a live operator may be desirable. To accommodate such operation, as described below, a user's call can be transferred to a live operator at one of the terminals 72 (FIG. 3). Generally, the operator terminals 72 include a display screen for advising the operator in relation to an instant situation ("screen pop") to the extent of available data.

The network switching unit 74 is a dial-up apparatus for operation with the server S to interface the network N. Accordingly, calls are placed or routed through the network N to a select one of the terminals S1 through Snn. The unit 74 operates with the control unit 64 and various forms thereof are well known. Finally, the data bank 71 also may take various forms and has a substantial memory capacity, storing information that is addressed as explained below. Of course, data storage, and specific addressing techniques are very well known and in that regard, many traditional structures and techniques might be employed. Specifically in that regard, U.S. Pat. No. 6,263,335, entitled "Information Extraction System and Method of Using Concept-Relation-Concept (CRC) Triples," issued Jul. 17, 2001 to Paik, et al., discloses and references considerable current art for storing and providing information. In accordance herewith, a rather direct addressing technique is disclosed based on indices. Alternative techniques and structures are certainly contemplated. Essentially, however, it is to be understood that the data bank 71 may be addressed in different languages (as programmed), by spoken words from the telephone instruments TI1-TIn to obtain desired information, often relating to, or involving the geographic area served, for example, by the active station, e.g. the station C1 currently serving a user.

In the disclosed embodiment, the following exemplary composite numbers or words may be spoken to access the platform 62 as described below and to accomplish various communications or operations.

| Called Number | Source | Ultimate Function |
| --- | --- | --- |
| (213) 555 6251 | TI1 | Call to custom program instrument operation |
| (213) 555 6262 | TI1 | Routine call, e.g. to the terminal S1 |
| (213) 555 9876 | TI1 or S1 | Call to increment pre-paid balance |
| 3333333333 | TI1 | Connect to operator |
| 4444444444 | TI1 | Call to learn TI1 backup data |
| "Home" | TI1 | Call home |
| "Information" | TI1 | Call for information service |
| (213) 555 1212 | S1 | Call to the terminal TI1 |
| (213) 555 9976 | S1 | Call for reporting location information on the terminal TI1 |

As indicated above, in accordance herewith, the input words spoken by a user to a wireless telephone instrument TI generally fall into specific classes. Spoken numbers (0-9) are designated "number words" and primarily serve for control and to dial-up called terminals. In repeating sequences and in various dialogs, spoken number words may serve as control words. For example, in programming: "say one if you wish English". Also, to obtain an operator, "three, three, three, etc."

When spoken, dial-up code words normally prompt specific operations, e.g. when programmed, the code word "Home" commands dialing-up the home of the instrument user. Other spoken code words may command various other operations, e.g. "Information" to initiate the information service. In the information-service operation, as described in detail below, a number of so called "index words" may be spoken to address the data bank 71 progressively and fetch select designated data for an individual caller. An exemplary addressing system is treated below.

To consider the structure and operation of the platform 62 (FIG. 3) in greater detail, reference will now be made to FIG. 4, where individual processes are represented by functional blocks. That is, individual processors 78 through 86 are shown to accomplish various functions. In that regard, note that the operations attendant the functions can be performed at various locations and allotted between the structures of FIG. 3. That is, process allocation between individual units, locations and components may vary widely in systems embodying the present developments. However, as illustrated, the separate processors 78 through 86 (FIG. 4) are disclosed in an effort to effectively and simply explain an exemplary embodiment.

Figure 4:
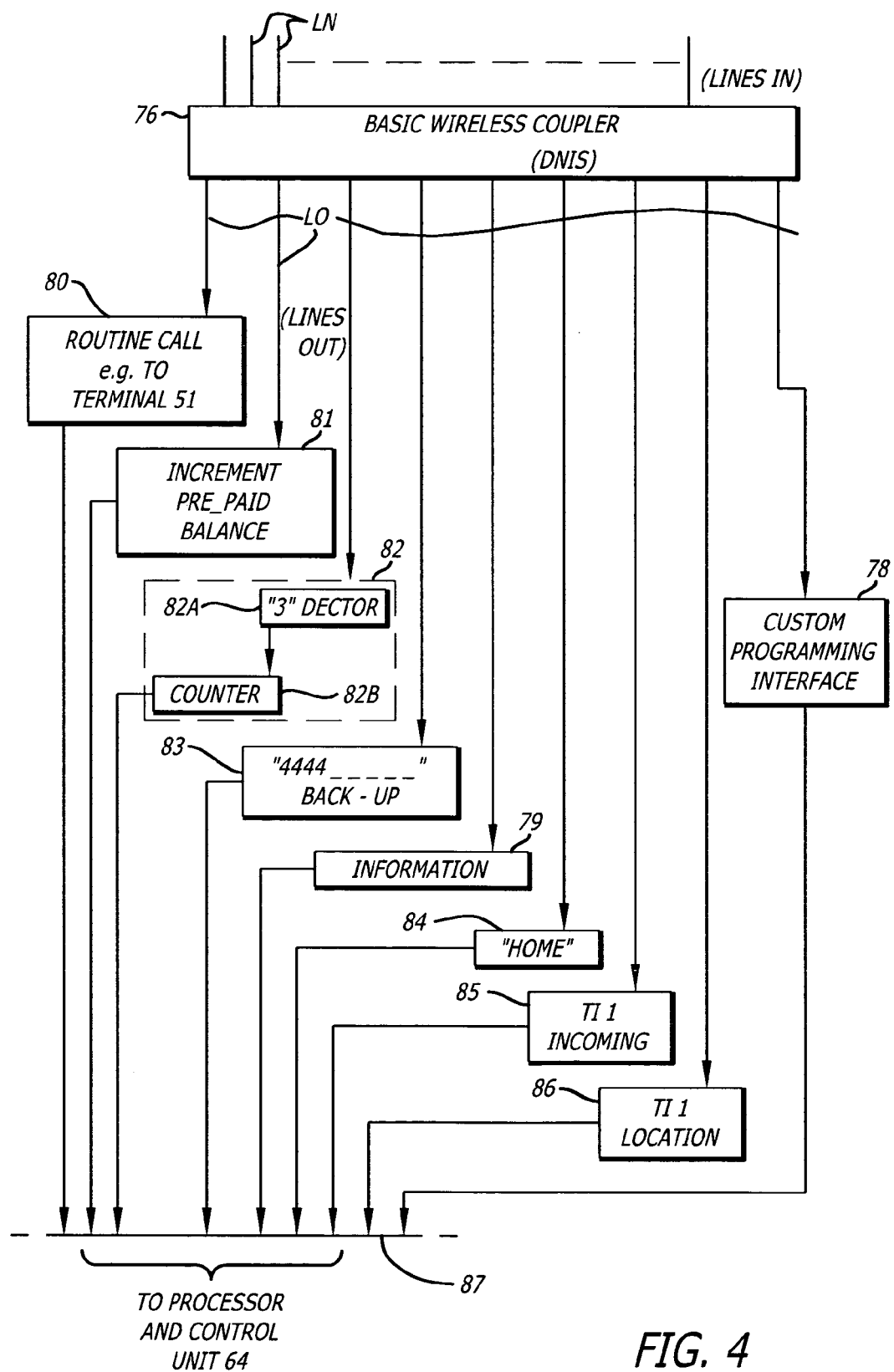
FIG. 4 is a partial block diagram of a component of the system of FIG. 3.

The various possible calls to the platform 62 (FIG. 3) from instruments TI, as indicated above, are received on lines LN (FIG. 4) and initially are processed by a wireless coupler 76 (FIG. 4). Specifically, forms of called number identification, e.g. DNIS signals identify a desired process or program of operation. Thus, essentially, the wireless coupler 76 functions as a crossbar to access one of the individual lines LO (out) from one of the lines LN (in). While only a single line is shown extending from the coupler 76 to each of the functional process blocks, it is to be understood that multiple lines are actually employed to accommodate and process many calls simultaneously. That is, numerous of the incoming ports or lines LN can simultaneously access any of the representative lines LO to accomplish simultaneous processing as will now be considered.

The initial call transaction from a telephone instrument TI may involve a called number, e.g. (213) 555 6251, as indicated in the above chart, or the initial call may be recognized automatically on the pre-programmed energization of an instrument. In either event, such a call is used to customize or program the instrument in accordance with the needs and desires of the owner or user. That process or series of process steps is performed by the custom programming interface or processor 78 (right) connected between the coupler 76 and the unit 64 (FIG. 3). Note that each of the processors 75 through 86 (FIG. 4) is connected to the unit 64 (FIG. 3) through a common junction 87.

As indicated, the custom interface 78 (FIG. 4) may be a component of the platform 62 (FIG. 3) and operates during a programming interface with a caller, along with other elements of the central station C1 to store data (memory 70) for customizing the use of each instrument. This simply involves a computer-telephone interface (CTI) in which the caller is prompted for programming choices that may be selected and stored by operations of the platform 62 and the control unit 64. Exemplary programming choices were mentioned above and some are treated in greater detail below. Note that the allocation of structure between the platform 62 and the unit 64 again is a matter of design choice. After completion of the custom programming any of the selected operations are available.

The processor 80 (FIG. 4, left) executes routine dial-up calls from the instruments TI. Basically, the processor 80 along with other central station components may prompt and sense spoken number words ultimately to provide dialing signals, e.g. DTMF or conventional digital signals to actuate the network switching unit 74 (FIG. 3) and accordingly attain the desired telephonic connection.

The processor 81 (FIG. 4) cooperates with other structure in the central unit C1 (FIG. 3) to increment the pre-paid balance for a designated instrument TI. For example, when the number words for a composite number (213) 555 9876 are vocalized from the instrument TI1, a value incrementing interface is established involving other elements of the central station C1. Essentially, an interface executes a transaction dialog for crediting the prepaid balance for an instrument and reflecting the amount of the increase, as for example as a credit card charge as explained below.

A spoken series of the number word "three" e.g. "33333333 - - - " is detected by the processor 82 (FIG. 4) which acts with other structure in the central station to bridge the caller to one of the operator terminals 72 (FIG. 4). As shown, a detector 82A (FIG. 4) for the spoken word "three" provides a pulse to a digital counter 82B which overflows at a count some predetermined number, e.g. eight, to provide a command signal through the common junction 87 to the unit 64 commanding a bridge connection to one of the operator terminals 72.

The processor 83 (FIG. 4) is structurally similar to the processor 82; however, it detects a series of spoken word numbers "four" ("44444444 - - - ") to command the unit 64 to provide a back-up number for the instrument, or dial up and bridge a connection to a terminal for emergency use in association with the instrument TI1. For example, when the user is disabled as a result of an accident or misfortune, the operation may be used.

If programmed for the information service operation, the processor 79 functions with the unit 64 to execute the information service. Essentially, the processor 79 detects a spoken code word, "information" to initiate the information service operation. In that operation, index words specify classes and subordinate classes (sub-classes, sub-sub-classes and so on) of information. For example, a caller looking for the location of a moderately priced Mexican restaurant might be cued to speak or identify the index words: Class: "Restaurant", Sub-class: "Moderate", Sub-sub-class: and "area A" Sub-sub-sub-class: "Mexican" Responsive information would then be provided to the caller from the data bank 71 (FIG. 3). An exemplary process is treated in greater detail below.

The processor 84 accommodates code word dialing, that is, customizing an instrument for a specific code word and/or words as spoken by a user. For example, code word dial-up commands, as for the command word "home" can be established. The processor 84 may be programmed to detect a spoken code word by a specific user then operate with the unit 64 to drive the unit 74 and bridge or otherwise attain a desired connection. As indicated, spoken numbers also may be customized to a user to improve the reliability of voice detection. If only number words need recognition, customizing normally is not necessary. However, with increased recognition demands, a customizing interface may be desirable, as for service information. In that regard, a multitude of techniques and structures are known, for example, see U.S. Pat. No. 6,212,498 entitled "Enrollment in Speech Recognition," issued Apr. 3, 2001 to Sherwood, et al., for its disclosure and reference content.

The processors 85 and 86 accommodate incoming calls for the instrument TI1 if programmed. The structures and related operations for the processors 85 and 86 are treated in great detail in parent cases.

In view of the above descriptions, to provide a complete understanding of the system and the related operating processes, an assumed operating sequence will now be explained. Accordingly, assume the instrument TI1 (FIG. 1) has been purchased and is to be placed in service. Although, as indicated the instrument may be variously programmed by a variety of different people, generally, for convenience, reference will be to a "user." Other actual possibilities include, a parent programming the instrument TI for a child, an employer programming for an employee, a sales clerk programming for a foreign purchaser, and so on. Also, note the parenthetical letters (T) and (C) indicate the site of action, telephone instrument or control respectively.

First, the user withdraws the antenna 14 (FIG. 2) actuating the switch device 30 and sets the switch 13 to the "on" position thus placing the instrument in the "active" state CE. In the active state CE of the instrument TI1, the control unit 56 (FIG. 3, left) fetches the instrument's identification data from the memory 56A then actuates the transceiver 54 to broadcast signals representative of the identification number (LR7438612-3TZ) or part thereof to initiate an interface. As a result, the central station C1 cues the instrument TI1. Specifically, as indicated by a block P4 (FIG. 5), after testing, the central station C1 transmits an introductory and instructional message to the instrument TI1. For example, the user might be advised: "Welcome - - - . To verify your instrument, please speak the activation number."

Figure 5:
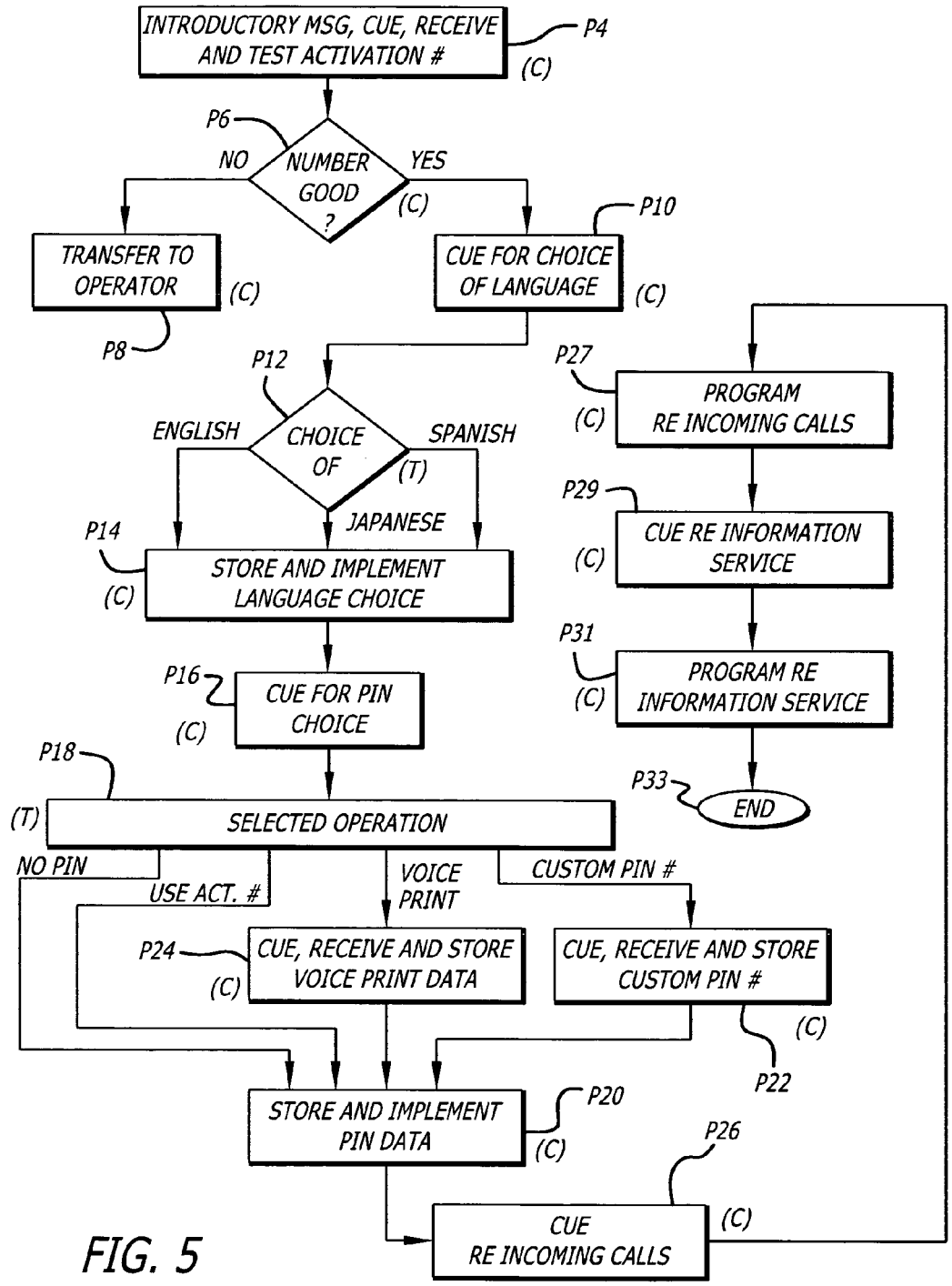
FIG. 5 is a flow chart illustrating certain operations of the system of FIG. 3.

Normally the number (e.g. 474632) would be spoken and tested as indicated by a query block P6. If the test is bad, or no number is received, the call is transferred by the unit 64 (FIG. 3) to an operator terminal 72. The step is represented in FIG. 5 by a block P8. If the test is good, i.e., "yes," the process advances to the first step of programming the desired language and possibly voice customizing. Incidentally, the initial verification will normally involve the language used where the instrument TI1 is sold.

To program the language choice, the user may be cued in stages or with several multiple choices. For example, the cue might involve the voice generator 66 (FIG. 3) controlled by the unit 64 and acting through the interface 78 (FIG. 4) to give an exemplary choice: "Please speak 'one' for English, 'two' for Spanish or 'three' for Japanese." The cuing operation is indicated in FIG. 5 by a block P10 and the choices are indicated by a query block P12.

Depending on the choice expressed by the user, a selection is confirmed and made as between: English, Spanish and Japanese (note block P14). As a result, the choice is stored in the memory 70 (FIG. 3) and serves to provide all subsequent interfaces in the selected language. Essentially, all cues are stored in each of the available languages and are simply programmed selectively during the activation of each instrument TI. Individual voice programming may be performed at this point or later, using known technology.

With the language programmed, the interface may next continue with programming the PIN verification. In that regard, the user again is given several options, for example, by the following cue as indicated by the block P16. "Your telephone instrument can be variously operated with regard to fraud control. The choice is yours. For no fraud control, say 'one'. To use the instrument activation number as a personal identification number, say 'two'. To select a custom identification number, say 'four'. To use your recognized voice for fraud control, say 'five'."

The various choices are implemented by operations represented by a block P18 along with various secondary steps. If no personal identification number is programmed, the process simply stores that selection as indicated by a block P20 and proceeds. Alternatively, if the user chooses to use the instrument activation number, e.g., "474632," that selection is stored and the process proceeds. See block P20.

Should the user wish an individual or personalized number, the steps of block P22 are implemented. Specifically, the user is cued for a desired PIN, which is received and stored for use in association with the instrument being programmed.

Finally, the anti-fraud selection may involve so-called "voice print" operation with the process cuing the user for several samples. The process is illustrated by the block P24 and involves cuing the caller, receiving samples, correlating such samples and defining a voice print for the user.

As stated above, instruments can be customized or programmed not only with regard to language, as explained, but as well with regard to voice, e.g. for number words. Such programming also may be performed at this stage, as part of the "voice print" operation, see block P24. For example, the ultimate user is cued to speak the numbers zero through nine (or other command words) which are voice printed for very reliable identification during the user's future use of the instrument. Thus, if desired, voice print data is stored to enhance personal voice recognition accuracy.

Next, the system is programmed with regard to the treatment of incoming calls. The operation of each telephone instrument with respect to incoming calls can be variously programmed. For example, incoming calls simply may not be accepted. Alternatively, if incoming calls are accepted, other possibilities exist, for example, with respect to limiting incoming calls. Individual instruments may be produced or programmed to coordinate a user's desires. For example, telephone instruments without the capability for incoming calls might be sold to users who desire to so use an instrument. Of course, other possibilities exist in that regard, and, normally the operation for each instrument is programmed in the central station, e.g., station C1. Programming regarding incoming calls involves a cue provided to the user as indicated by a block P26. For example, the cue might state: "To receive incoming calls, say '1'. Otherwise, if you do not wish to receive incoming calls, say '2'." The choice between accepting or refusing incoming calls is represented by a query block P27 (FIG. 5). If no incoming calls are to be taken, the process proceeds to an advanced step in the process. Otherwise, as described in a parent case, several programming operations are provided to accommodate incoming calls.

The process next involves the steps of programming the availability of information service. The user is given a cue to accept or reject the information service, e.g.: "If you wish to have information service, please say 'one' otherwise say 'two'". The step is illustrated in FIG. 5 by a block P29.

An expression of acceptance ("one") by the user prompts the processor and control unit 64 (FIG. 3) to program the individual instrument TI1 for information service, note block P31. Alternatively, if the service is rejected that choice is stored.

In FIG. 5, the programming phase is indicated to be concluded by a block P33, following the information service programming. However, it is to be understood that as disclosed in detail in a parent case, several other programming aspects can be offered. For example, an instrument may be programmed for use only in limited areas (e.g., area codes) or during limited times. The system simply cues the user regarding limits and if desired, the details are stored to accomplish the desired program of operation.

For routine use of the instrument TI1, the user simply speaks the desired number to be called, e.g. "one, two, one, three, five, five, five, six, two, six, two." As suggested, depending on program choices, the number words 0-9 may be voice-printed for improved accuracy in translation to dial-up formats. Depending on design choices, number words may be spoken individually or in sequence as a complete series, for example to express a composite called telephone number. Normally, confirmation will be provided in either procedure, digit-by-digit or totally. In any event, the sounds of the spoken words impact the microphone 28 (FIG. 3) and are converted to audio signals, a representative form of which are broadcast by the transceiver 54 using the antenna 14.

At the wireless central station C1 (FIG. 3), the transmitted signals representing the called number are received and applied to the control unit 64. Ultimately the signals are converted to a dial-up form (e.g. DTMF) and are applied to the network switching unit 74 (FIG. 3). Thus, a dial-up operation and is accomplished through the server S and the public switched telephone network N.

Assume now that the information-service feature was programmed, and consider the related operations in greater detail. As indicated above, the service is commanded by a user speaking the code word "Information" to activate the processor 79 (FIG. 4). Essentially, the spoken control word is detected by the wireless platform 62 (FIG. 3) along with the voice recognition unit 68 to actuate the information service process.

As indicated above, the data bank 71 (FIG. 3) is organized for classified index word addressing to reveal geographically related data. For example, the index format for the data bank 71 may be as follows:

| CLASS | SUB-CLASS | SUB-SUB-CLASS | DATA |
|---|---|---|---|
| Restaurants | | | |
| | Expensive | | |
| | | French | |
| | | * | |
| | | * | |
| | | Chinese | |
| | | | Wong's Garden |

-continued

| CLASS | SUB-CLASS | SUB-SUB-CLASS | DATA |
|---|---|---|---|
| | | | 21 Ventura St. |
| | | | Catalina, CA |
| | | | In Newmark Center |
| | | | (818) 555 2341 |
| | | | * |
| | | | * |
| | Moderate | | |
| | * | | |
| | * | | |
| | * | | |
| Retail Stores | | | |
| | Eureka City | | |
| | | Sporting Goods | |
| | | | Hi-play Sports |
| | | | 777 Main St. |
| | | | Eureka City, UT |
| | | | (801) 555 7689 |
| | | | * |
| | | | * |
| | | | * |
| Transportation | | | |
| | Carston City | | |
| | * | | |
| | * | | |
| | * | | |

For convenience, holders of the wireless telephone instruments TI may be given a printed index of the accessible information using a format as indicated above, however, limited in the extent of subordinate classes. In any event, in the process, users simply speak the various word indices to indicate class, sub-class, sub-sub-class and so on, which information is coded to address the desired information from the data bank 71. For example, a dialog might be as follows to prompt the indices for a caller's information.

Caller: "Information"

Voice generator 66: "you have requested information service, please speak the class of information you desire."

Caller: "Transportation."

Voice generator 66: "You have specified the 'transportation class', sub-classes are cities in your area including: City A, City B, and City C. Of those sub-classes, please speak the sub-class you desire."

Caller: "City A."

Voice generator: "Sub-sub-classes for transportation in City A are: taxis, buses, and subway. Of these sub-sub-classes, please speak the sub-sub-class you desire." - - -

Thus, in one form or another, the word indices for an information request are received by the wireless station C and are stored in a buffer storage of the processor and control unit 64. Using the stored information indices (perhaps in an alpha-numeric form), the control unit 64 addresses the data bank 71 to produce voice signal representations for driving the voice generator 66. Accordingly, the caller is provided with the data or information that was requested. For example: "Taxi service in City A is provided by Orange Cab, and the telephone number is (614) 555 8209. If you want us to dial the number please say 'yes'".

Note that progressive indices may involve various numbers of subordinate classes, e.g. sub-classes, sub-sub-classes, sub-sub-sub-classes and so on. As in the above example, with the selection of each index, the data bank 71 may indicate further subordinate classes and accordingly advise a caller. In that manner, addressing the desired information becomes progressively more specific. To ease the burden of translation, or speech recognition, secondary indices may be specified substantially exclusively as number words. For example, after requesting "Information" service, and identifying a class, e.g. "Transportation," all cues may provide sub-class indices as selection choices by number. Rather than to cue the caller stating: "City A, City B, or City C" the cue would be: "For City A, say, 'one', for City B, say, 'two', for City C, say, 'three'".

Accordingly, the speech recognition burden is substantially reduced. Of course, in some instances the numerical indications are impractical due to the number of possible choices, as with the initial classification of the information. In one embodiment, the data bank 71 typically is organized on the basis of target characteristics and areas. For example, target classifications might be restaurants, garages, medical services, hotels, and so on. Sub-classes for restaurants for example might be related to cost, e.g. expensive, moderate and inexpensive. Sub-sub-classes, for example might be food types, e.g. Italian, Mexican, and Chinese. Areas and sub-classifications of areas will depend on the system; and the facts, however, for a cellular system the basic area may be the cell with sub-classes being divisions thereof.

For purposes of describing the logic of the location service, some representative designations are assigned. Using restaurants as an exemplary class, the designations are:

Target Classifications:
T: Class, e.g. restaurant
T1: Sub-class, e.g. cost, inexpensive T11
T2: Sub-sub-class, food, e.g. Mexican T21
Area Classifications:
A: Basic area, e.g. Cell
A1: Sub-areas, e.g. west A11
A2: Sub-sub-area, e.g. north of central, A21

Somewhat summarily, a disclosed embodiment hereof involves target isolation logic embodied in the processor and control unit 64 as disclosed in detail below. Generally, the operations can be summarized to some extent as below; however, note that repetitive cycles are executed to isolate targets. That is, it is an iterative process involving area and target characteristics.

STEPS:
DEFINE AREA A
OBTAIN TARGET T Class
Test for presence of T's in A
If few report; if several obtain T vs. A priority
If priority is T, test for presence of T1 in A
If priority is A, test for presence of T in A1s
| | |
| | |
| | |

Figure 6:
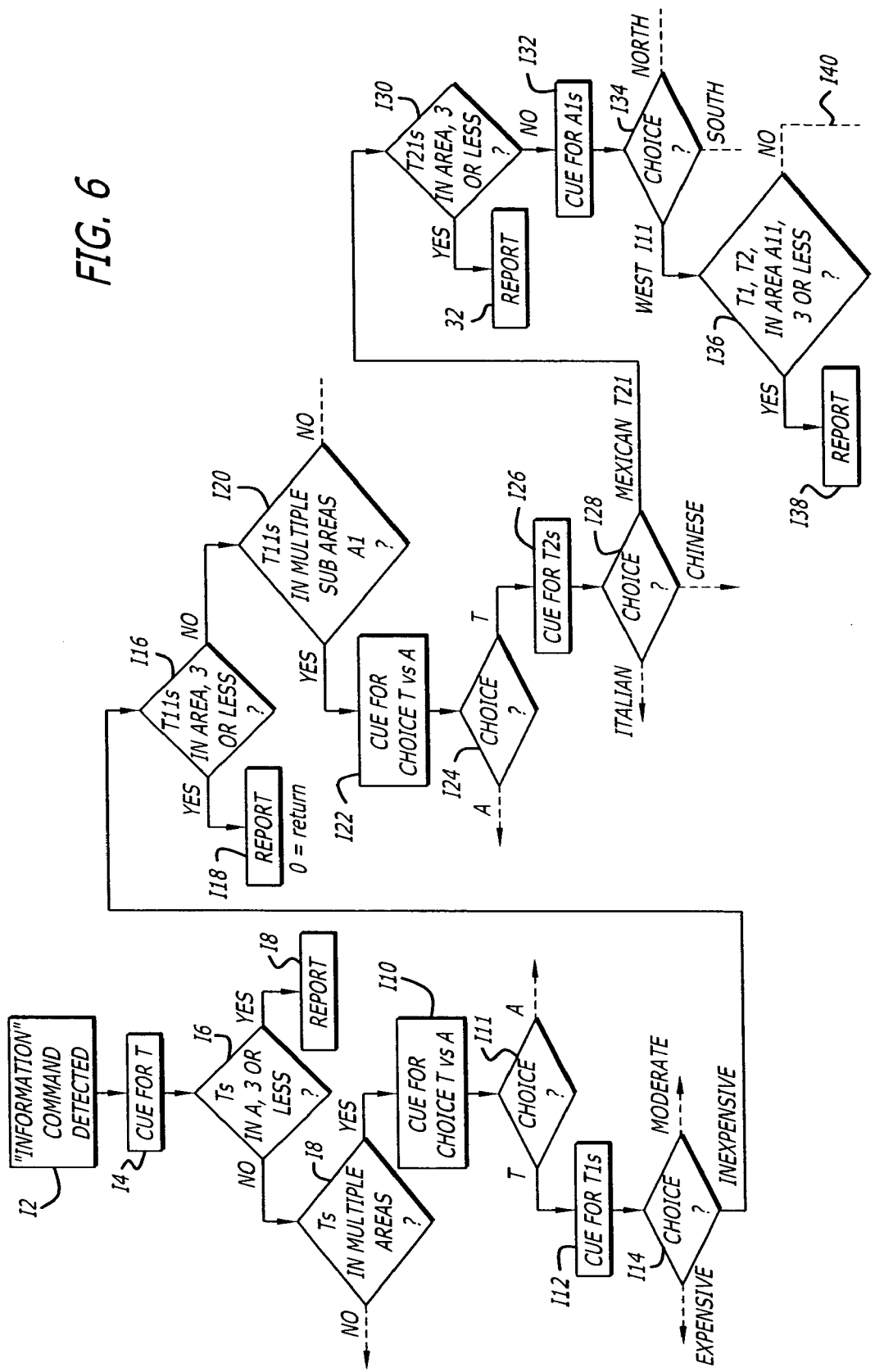
FIG. 6 is a flow chart detailing further operations of the system as depicted in FIG. 3.
Figure 7:
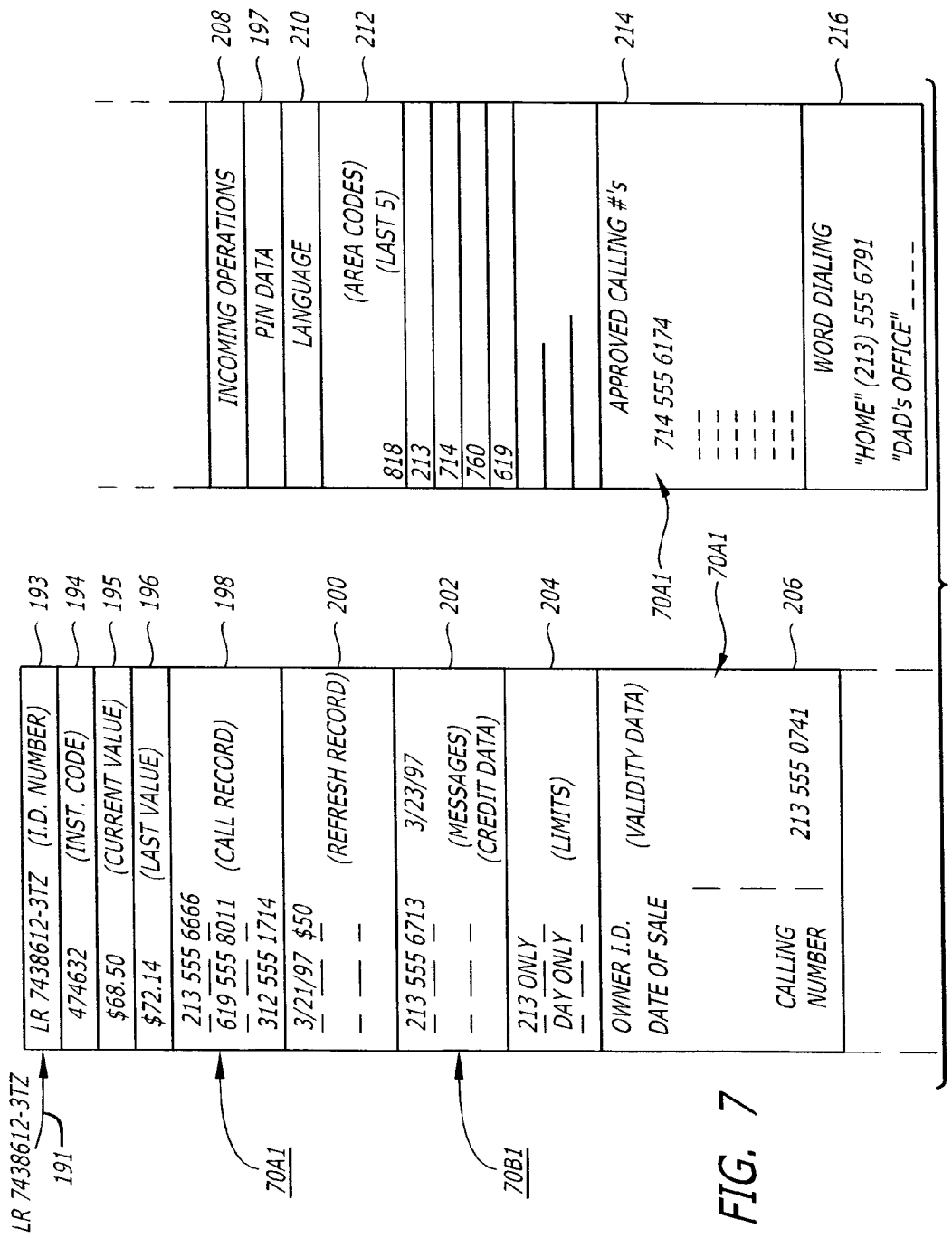
FIG. 7 is a symbolic diagram of memory in the system of FIG. 3 for representing data on a wireless telephone in accordance herewith.

In view of the above preliminary explanation, the logic of the system will now be treated with reference to FIG. 6. Upon sensing the spoken code word "information" from a caller, the information processor 79 (FIG. 4) is activated with the processor 64 (FIG. 3) to initiate the "information service." The occurrence is represented by a block I2 in FIG. 6.

At the outset of the interface, the central station cues for the basic target classification T, e.g. the class "restaurants" although such is the example, clearly any class could be similarly treated.

With the target class, the system goes to the data bank 71 for the area class A to determine the general number of targets in the area, e.g. restaurants. If there are only a few, e.g. three or less, as tested by the query block I6, they are reported (block I8). For example, the dialog may be: "There are two restaurants in the area as follows: a Chinese restaurant, Sing Lo at 18 Main in Cloverdale, 310 555 2478 and a Cafe at 230 Western, in Cloverdale, Dew Drop Inn, 310 555 6743. - - - " The report involves addressing the data bank 71 with the indices to provide the data.

If the data bank 71 indicates that there are more than a few restaurants in area A (I6), another test determines whether there are restaurants in multiple sub-areas A1 of the area A, see block I8. If so, the caller is queried (block I10) as to the priority of restaurant type versus, restaurant location, i.e. target sub-class T1 versus area sub-class A1. The cue for a T versus A test is represented by block I10 and the selection is indicated by a query block I11.

Assuming the caller is more concerned with the type restaurant than with location, the next cue sets out the possibilities or types of T1s, i.e. inexpensive T11, moderate T12, or expensive, see block I12. Assume that from the query block I14, the caller selects "inexpensive." Another test is prompted, again involving the number of identified targets in the area.

If the step of query block I16 indicates there are only a few inexpensive restaurants in the area A, they are reported, see block I18. Note that by saying the number word "zero" the system reverses to a prior decision point.

If from the query of block I16, on targets in area, there are several, another test is performed. Specifically, per a block I20, a determination is made as to whether there are inexpensive restaurants in multiple sub-areas, e.g. A1. If so, the caller is again prompted for a selection of priority between area A and class or type target T, see block I22.

Again, assume the caller desires to prioritize the target type, as indicated by the query block I24. Consequently, per block I26, the caller is cued for a choice, per block I28 with the available sub-sub-classes, i.e. Italian, Chinese or Mexican. Assume Mexican T21, is selected as represented by the block I28.

The next step, of query block I30, is to determine if there are more than a few Mexican restaurants (T21) in the area. If not, the few are reported as described above and represented by a block I32. If not, the process proceeds.

Previously, after a determination, the caller was given a choice of priority area and class. However, at some point, the classification becomes rather defined, e.g. an inexpensive Mexican restaurant. In that event, the process may proceed to area considerations, as represented by a cue block I32. Essentially, the caller is cued to select one of plural areas, e.g. north, south or west (A11).

The choice of west (A11) is represented by a query block I34 and the presence of restaurants is tested, per block I36. If there are only a few inexpensive Mexican restaurants I the sub-area "west" (A11) they are reported (block I38) as explained above. Conversely, if there are many, the process continues as indicated by a dashed line I40 to further specify a target or targets.

In FIG. 6, several paths are terminated by dashed lines. However, from the logic of the exemplary paths, the process steps of such paths will be apparent to one skilled in the art. Essentially, area and type are prioritized to the extent available, then selections proceed in an iterative process.

As another aspect of the process, as indicated above, at certain stages of the process, as for example after a report, at block I18, the caller may return to a prior junction by speaking the number word "zero." For example, after assigning priority, the caller may have a change of mind. Thus, targets are attained and identified.

Repeatedly, reference has been made to the memory 70 (FIG. 3) in relation to various operations. As indicated, individual memory portions are provided for each of the wireless instruments TI1-TIn. Depending on system design, regulatory provisions and operating formats, the contents of the memory 70 may vary to a considerable extent. Regarding the audio memory 70B, typically, digital recording also will be utilized. However, in that regard, audio is simply recorded and utilized in accordance with well known techniques of the art.

As indicated above, stored data includes an identification number, for example, "LR7438612-3TZ" for the instrument TI1. As instruments in accordance herewith may be treated somewhat differently in various systems, it is to be recognized that the indicated number is merely illustrative, and conventions, regulations and so on may command identification numbers or data in totally different forms in view of considerations as set forth in the above-referenced book, *Mobile Telecommunications Networking*. Again, a detailed treatment of identification numbers for mobile instruments or stations is provided in that book, specifically in a section beginning on page 64.

Recapitulating briefly, with activation of the instrument TI1, its identification number is transmitted (broadcast) from the instrument TI1. On receipt at the central station, e.g., central station C1, the number is used by the processor and control unit 64 to address the memory section 70 and accordingly locate specific memory portions, e.g., portion 70A1 and 70B1 for the instrument TI1. Thus, memory portions are addressed individually by the identification numbers as illustratively represented by an arrow 191 in FIG. 6 (upper left).

The exemplary memory cell or portion 70A1 includes a number of individual fields shown horizontally arranged in FIG. 10 containing data including operational data for controlling interface operations with the instrument TI1 as programmed from that instrument. At the top of the section 70A1, a field 193 stores the identification number ("LR7438612-3TZ) for confirmation of the instrument.

Next in order as shown, a field 194 registers the instrument activation code, e.g., "474632". Depending on the programming, the field 194 may continue to be used for anti-fraud control. Alternatively, the field 197 (right) may store data to verify a user as explained above.

A pair of related fields 195 and 196 respectively store the current and last prior prepaid values of the instrument TI1. The current value, e.g., $68.50 is used for authorizing use and is reported to the user. The prior value is accessible to an operator, as by "screen pop" techniques, or selective addressing, along with all fields of the section for reference purposes, as at one of the operator terminals 72.

As indicated above, another operation in the outgoing mode involves a transaction of incrementing the pre-paid balance. The operation may be initiated as a result of a specific call to a designated calling number. The logic will now be treated with reference to FIG. 8.

Essentially, value is added to the prepaid balance of the telephone instrument TI1, by incrementing the value stored in the memory cell 70A1. For example increments of either fifty or one hundred dollars might be available. The selected increment of value is reflected in the balance stored at the central station C1 (home station for the instrument TI1) and may be supported by a conventional credit card. Limited data (credit card number and expiration date) may be sufficient to support the transaction. However, it is not uncommon to additionally require the card holder's name or other data. As disclosed below, such additional data may be communicated in the form of audio signals representing words spoken by the user. Essentially, with the processor 81 (FIG. 4), the control unit 64 (FIG. 3) records such audio information in the audio memory section 70B.

Considering the value-adding subprocess in detail, a block 150 (FIG. 8, top) designated by an "A" indicates the start. The initial step (block 152) of the sub-process involves cuing the user to state the number of the credit card for supporting the increment of value. The number is spoken digit-by digit to be received, in audio form at the control station C1 in FIG. 3 (see block 154, FIG. 8). As described above, the resulting audio signals may be converted to digital or other representations for storing or further processing. Comparison tests also may be performed as described above.

Figure 8:
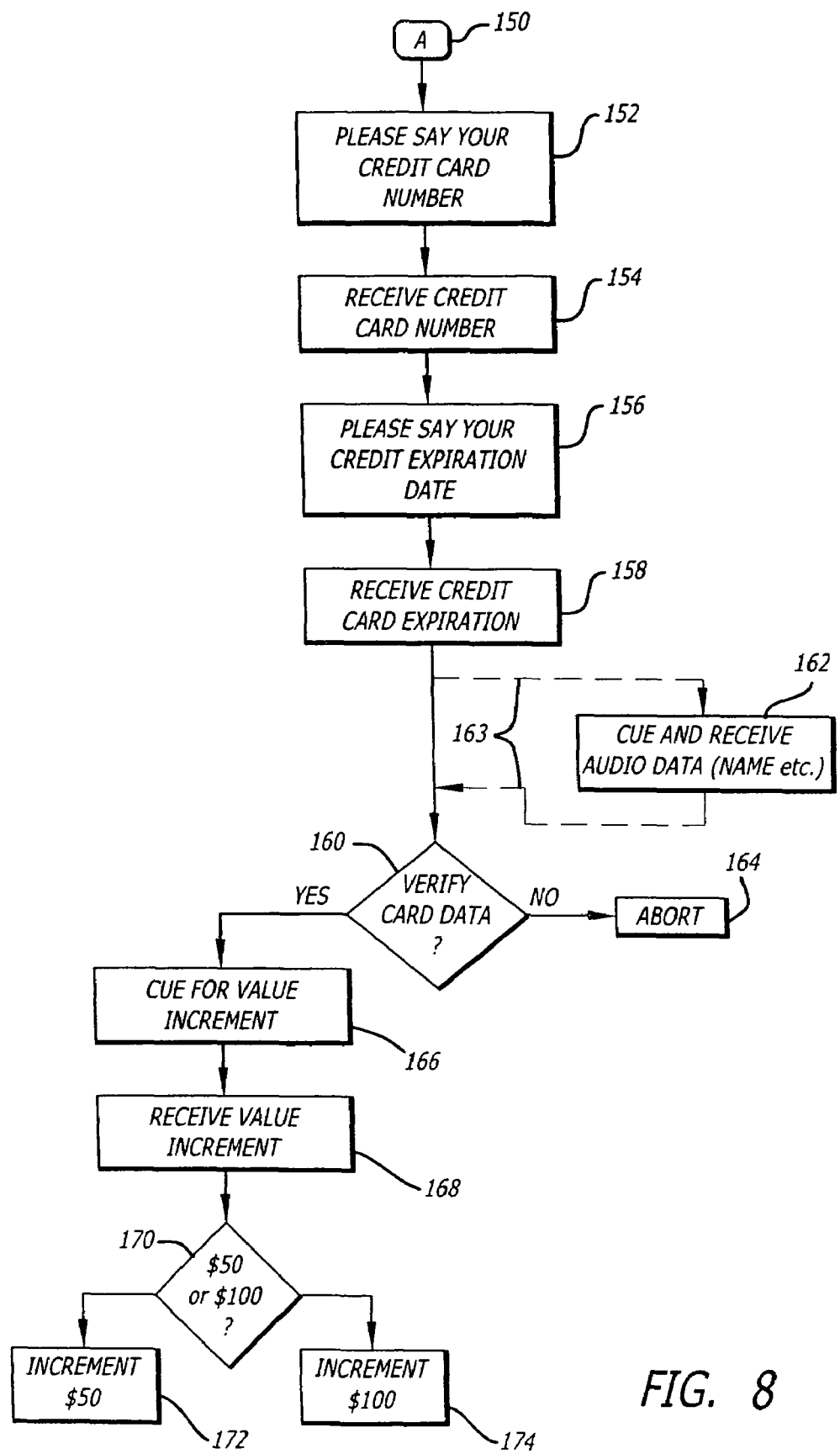
FIG. 8 is a flow chart detailing further operations of the system as depicted in FIG. 8.

Next, the user is cued by the voice generator 66 (FIG. 3) to speak the card expiration date (FIG. 8, block 156). Again, the date is spoken and received as audio signals then stored and processed as illustrated by a block 158.

Unless the process encompasses taking alphabetic word data, e.g. the user's "name", "address" and so on, the next step involves a query as indicated by the block 160. If alphabetic word data is to be taken, a block 162, indicates the alternative step as a dashed-line path 163, which involves cuing, receiving and distinctly recording or processing such data, again in the form of audio signals. The audio signals representative of alphabetic words and indicating credit data is stored in the memory section 70B and may involve subsequent processing, as by a person.

In any event, the process next advances to the query block 160, indicating a test executed by the control unit 64 (FIG. 3) to verify the received data. If the data is only digital, verification typically would be online. With verification, the transaction is approved. Otherwise, the process advances to a block 164 (FIG. 8) indicating an abort of the communication.

Proceeding along the "yes" path from the query block 160, the next step is to cue the user for the value increment, e.g. "$50" or "$100"? The step is indicated by a block 166 and involves the user either speaking the digit "one" for a "$50" increment, or the digit "two" for an increment of "$100".

The spoken increment digit is received, as indicated by a block 168, converted to digital signals and depending on the selected option is processed by recording the increment. The operations are illustrated by a query block 170 and the alternate incrementing blocks 172 and 174 whereby value is added to the prepaid balance of instrument TI1. Thus, the final step is executed by the control unit 64 (FIG. 4) and the memory 70. Specifically, the memory cell 70A1 stores the incremented prepaid value of the instrument TI1.

A series of similar fields 198 (FIG. 6) are collectively identified and store a record of the calls made by the instrument TI1. The fields 198 may be organized as a transient memory for some predetermined number of calls that were made most recently. For example, only the last twenty calls might be stored. Designation or target telephone numbers are illustrated for the three last calls made from the instrument TI1. Dates also may be recorded as a record for operator use.

Another series of similar fields 200 also is collectively represented and provides a record of refreshed value increments. Specifically, incremental values and dates for adding value to the prepaid balance are stored as shown. Again, the storage may be transient covering some predetermined number of prior occasions, again for operator use.

As previously suggested, the system can receive and report messages via the instrument TI1. Messages, in the form a telephone calling number and a date, are stored in a group of memory fields in the section 70B1 collectively designated as fields 202. Alternatively, these fields may be flags correlated to audio data stored separately. Audio credit data, e.g., name and so on, also is stored in the field 202.

The next field 204 relates to limitations imposed on outgoing calls. Accordingly, this feature involves limitations that may be imposed individually on each instrument TI, for example on the use of the wireless telephone instrument TI1. Some examples will explain the feature and its operation.

One potentially widespread use of instruments in accordance herewith is by young students as in elementary school. With the defined risk of loss, the convenient physical form of instruments hereof, and the simple operation, parents may wish to provide instruments to their children both for security and routine communication. To further limit the risk attendant such instruments, use limitations can be imposed.

Pursuing the example of a young student as the user, it might be expected that proper use of the instrument TI1 would be restricted to a single destination dialing area, e.g., "213." Accordingly, the use of the instrument can be so limited by storing the area code or codes that are approved for calls. Such limitations are stored in a group of fields 204 (FIG. 6) and are employed to test outgoing calls for the instrument. Such tests may be executed similarly to other outgoing tests as explained above. A test or tests would be performed by the processor and control unit 64 (FIG. 3). The test would check the called number (or other limitation data, as time) against the reference area code numbers (or other control data) stored in the fields 204 (FIG. 6).

As suggested, another limitation may be based on the time of day when calls can be made. For example, the day (twenty four hours) might be divided into four segments of six hours each called: "morning", "day", "evening" and "night". The instruments TI may then be restricted individually for use to any one or more of the segments. For example, an employee given the instrument TI1 might be restricted to using it only during the segments designated "morning" and "day". The approved six-hour segments are stored in the fields 204 and are imposed by verification processing in the control unit 64 (FIG. 3).

Generally, attempted use of the telephone instrument TI1 that is outside the imposed limitations will be aborted in favor of a brief denial message. Thus, the risk of loss from clones, lost or misused instruments is further reduced. Returning to consideration of the memory section 70A1 (FIG. 6) a group of fields 206 store various personal and statistical data on the assigned owner or user. Again, such information is available to be displayed to an operator. Often such data will be useful in communicating with users, as in the cases of interrupts or abort situations. Emergency data also may be included, as for example, the home telephone number of a young person or that of a specific medical facility.

A group of fields 208 store the programmed instructions regarding incoming calls. As indicated, the instrument TI1 can be variously custom programmed, as for example, to reject all incoming calls, selectively accept incoming calls, take messages and so on.

As explained above, another programmable feature is the interface language, e.g., English, Spanish or Japanese. The selected language data for the program is contained in the fields 210.

A group of fields 212 store area codes or other call-number geographical indications of communications by the instrument TI1. The data is processed to provide location reports as explained in detail above. A related set of fields 214 identify calling stations that are approved for receiving location reports. Thus, as illustrated, the terminal S1 (FIG. 4) can be ANI identified with a calling number of (714) 555 6174 and be authorized to call for a location report. As indicated above, a personal identification number also may be required and such calls may be limited to a "900" call number.

A group of fields 216 correlate spoken signature words from the instrument TI1 to a specific terminal to be called. As illustrated, for the customized instrument TI1, the spoken word "home" is identified to locate the number (213) 555 6791 which is the home number for the assigned user of the instrument TI1. Basically, a decoded number representation of the word "home" is stored to locate the number to be called or dialed up. Consequently, when the word "home" is spoken to the instrument TI1, it is processed to retrieve the desired number from one of the fields 216. The retrieved number then is dialed and a connection is bridged, as by the network switching unit 74 (FIG. 4).

In view of the detailed descriptions set out above, the structure and operation of the system to be custom programmed and execute effective communication processes will be apparent. However, a few additional comments may be appropriate in relation to various applications of the system. The case of a young student was considered above and is here emphasized in the interests of security and communication. Telephones are often unavailable when most needed and in the case of young people, the need may be extreme.

The same features that render an instrument hereof to be suitable for a young person also are present for numerous other applications. Specifically, reduced risk of loss, minor complications of ownership, customized operation and considerable convenience for storage render such instruments practical for travelers, automotive use, employee assignment, pager users, and a host of others. The convenience and utility of systems hereof afforded foreign visitors is also particularly noteworthy. Programmed with a visitor's language and customized for individual use, a unit also may be a source of information, translation or directions, as from an operator terminal. The cost of a base unit, programmed for outgoing calls only, and for a foreign language interface could be very small in relation to the service that is available.

Instruments carried in automobiles also could add considerable safety and convenience in relation to the cost. Additionally, as explained, traveling employees could well be provided instruments by employers. In general, distribution locations could be virtually anywhere, for example, airport shops, convenience stores and so on.

In view of the above explanations of exemplary systems, processes and features, it will be apparent that other embodiments and processes may be employed utilizing the developments hereof as in relation to instruments, wireless equipment, storage and programming. In some instances such may be implemented by incorporating substance from parent cases which are incorporated by reference herein. Accordingly, the proper scope hereof is deemed appropriately determined on the basis of the claims as set forth below.

What is claimed is:

1. A wireless telephone system for use with wireless telephone instruments and a dial up network, to provide various forms of information on request comprising:

a platform for interfacing a plurality of wireless telephone instruments to receive information request signal representations originating from inquiring wireless telephone instruments;

a data bank for storing geographically related location data with reference to facility classes; and a control system for receiving information request signal representations from said platform in response to cues and in the form of progressive indices originating from an inquiring wireless telephone instrument for accessing the data bank to provide select of the geographically related location data to the platform for communication to the inquiring wireless telephone instrument.

2. A wireless telephone system in accordance with claim 1 wherein the geographically related location data is referenced to classes and subclasses of facility information in specific geographic areas accessed by said progressive indices.

3. A wireless telephone system in accordance with claim 1 wherein the platform receives signal representations from the wireless telephone instruments representative of target classifications relating to facility classes and area classifications relating to geographic area.

4. A wireless telephone system in accordance with claim 3 wherein the signal representations from wireless telephone instruments relating to geographic area define cell areas.

5. A wireless telephone system in accordance with claim 4 wherein the cell areas include basic cell areas, and sub areas of cell areas.

6. A wireless telephone system in accordance with claim 1 further including a voice translator for converting voice signals, and wherein the platform receives voice signal representations originating from the wireless telephone instruments.

7. A wireless telephone system in accordance with claim 1 further including a voice generator for prompting callers at the wireless telephone instruments for progressive indices.

8. A wireless telephone system in accordance with claim 1 wherein the information request signal representations signal representations originating from an inquiring wireless telephone instrument are formed from spoken words at the inquiring wireless telephone instrument and are preceded by a code word provided from said inquiring wireless telephone instrument.

9. A wireless telephone system in accordance with claim 1 wherein the information request signal representations originating from an inquiring wireless telephone instrument specify progressive indices of classes and sub classes of data.

10. A wireless telephone system in accordance with claim 9 wherein the signal representations originating from an inquiring wireless telephone instrument are derived from spoken words at the inquiring wireless telephone instrument.

11. A wireless telephone system in accordance with claim 1 wherein the information request signal representations originating from an inquiring wireless telephone instrument are prompted by the control system as multiple choices.

12. A system according to claim 1 wherein the control system performs repetitive cycles of operation with respect to the geographically related data to isolate a target of geographically related location data.

13. A process for interfacing a plurality of mobile wireless telephone instruments to provide geographically related target location data as requested by an inquiring mobile wireless telephone instrument, comprising:

interfacing a plurality of mobile wireless telephone instruments located in different geographic areas for wireless communication;

storing information in a data bank organized for classified index word addressing by progressive indices to access select geographically related target location-data;

receiving an information request signal to identify an inquiring mobile wireless telephone instrument;

cuing the inquiring mobile wireless telephone instrument through a series of repetitive cycles to receive progressive indices to access the target location data in the data bank;

communicating the target location data to the inquiring mobile wireless telephone instrument.

14. A process according to claim 13 wherein the progressive indices are derived from spoken words at the inquiring mobile wireless telephone instrument.

15. A process according to claim 13 wherein word indices specify classifications of geographically related data.

16. A process according to claim 13 wherein select of said repetitive cycles include multiple choice cues.

* * * * *